United States Patent [19]

Wells et al.

[11] Patent Number: 4,958,895
[45] Date of Patent: Sep. 25, 1990

[54] OPTICAL WAVEGUIDES

[75] Inventors: Paul J. Wells, Cambridgeshire; David Bloor, Brentwood, both of United Kingdom

[73] Assignee: GEC-Marconi Limited, Stanmore, United Kingdom

[21] Appl. No.: 370,307

[22] Filed: Jun. 23, 1989

[30] Foreign Application Priority Data

Jun. 24, 1988 [GB] United Kingdom ................ 8815087

[51] Int. Cl.$^5$ .............................................. G02B 6/10
[52] U.S. Cl. ............................. 350/96.12; 350/96.3; 430/270; 430/32; 428/515; 252/582
[58] Field of Search ............... 350/96.11, 96.12, 96.3, 350/96.33, 96.34; 252/582; 428/515; 430/270, 32

[56] References Cited

U.S. PATENT DOCUMENTS 3,809,732  5/1974  Chandross et al. .................. 430/321
3,955,015  5/1976  Ohtsuka et al. .................. 350/96.12

FOREIGN PATENT DOCUMENTS 1394747   5/1975  United Kingdom .
2045966  11/1980  United Kingdom .

Primary Examiner—John D. Lee
Assistant Examiner—John Ngo
Attorney, Agent, or Firm—Spencer & Frank

[57] ABSTRACT

A thin film optical waveguide made of a polymeric waveguiding film supported on a substrate, the film being made of a homopolymer of vinylpyridine or of a derivative or vinylpyridine in which the pyridine heterocyclic nucleus is substituted. Alternatively, a copolymer containing a major proportion of vinylpyridine, or of said derivative thereof, may be used in the film. A layer of a material having a lower refractive index may cover the film. The polymer may be modified to increase its capacity for refractive index variation in response to an electric field, by inclusion in the structure of the polymer of at least one optically nonlinear moiety. The polymer may also include cross-linking. The thin film optical waveguide may incorporate a laser dye in the film, for use with laser devices.

16 Claims, 10 Drawing Sheets

OPTICAL WAVEGUIDES

BACKGROUND OF THE INVENTION

1. Field of the Background

The invention relates to optical waveguides and to waveguide devices such as optical switches such as used in telecommunications. The invention is in more specific terms concerned with optical waveguides comprising poly-4-vinylpyridine.

2. Discussion of the Background

As communication and data transfer systems increasingly employ optical fibres, there is a growing requirement for optical and electro-optic devices for switching purposes.

Many materials have been investigated for use in such devices. For example, it has been found that some liquid crystal materials can be used in optical switches but these have tended to suffer from the disadvantage that switching is too slow.

Inorganic material such as lithlum niobate have been used but are difficult to prepare in a satisfactory form.

Molecular weight organic materials in optical and electro-optic devices has been investigated over recent years. However, there are significant problems which still remain, both in predicting the values of non-linearities for organic crystals and in achieving the necessary crystal structures. Despite the fact that considerable success has been achieved in producing organic crystals with good non-linear optical properties and resistance to radiation damage, there are serious problems in the fabrication of the thin single crystal films required.

In contrast, polymeric materials can easily be fabricated into thin films and this has resulted in a growing interest in their application to integrated optics. Methods have been devised for the photo-fabrication of low loss channel guides, particularly in polymethylmethacrylate and also the production of multilayer optical circuits (see, for example, L Kato and M Komatsu, Elect. and Commun. in Japan, No. 66-C, 106 [1983]). Emphasis has recently been given to the non-linear optical properties of polymeric optical guides incorporating loadings of organic molecules having large optical non-linearities (see, for example, G Elliott, MRC, ITM 84/2). The loaded polymers are usually prepared from a solution of the polymer and the material to be loaded into the polymer. Alternatively, it is possible to employ as the material to be loaded a monomer which can subsequently be polymerized into the overall polymeric structure. Of course, the material to be loaded can also be diffused into a preformed polymer, although this method suffers from the disadvantage that small quanities only of the active loading material can be incorporated into the polymer in this way. Evaporation of a mixed solution generally results in the production of a polymeric glass having a uniform distribution of active material.

In some system, however, the materials used undergo phase segregation even at low concentrations. This limits the usefulness of the polymeric materials concerned due to the imposed limitations on the capacity of the polymeric material to suffer variation in refractive index in an electric field. Polymethylmethacrylate is probably the most widely studied polymeric matrix material. G Khanarian et al, Proc SPIE 682, 153, 1987 discloses that the maximum loading of 2-methyl-4-nitroaniline in polymethylmethacrylate is 10% by weight. Active waveguides using polycarbonate with a 65% by weight loading of R-(+)-5-nitro-2-[N-(1-phenylethyl)-amino]pyridine (MBA-MP) have been reported although this level of loading for polycarbonate is by no means universal.

The incorporation of a dye in a thin film polymeric waveguide is known to provide an increase in refractive index. The use of dyes in this way has, however, been limited by the difficulty in incorporating substantial amounts of dyes in polymer films. It has been found that, for example, the larger thiapyrilium dye molecules segregate from polycarbonate to some extent at loadings of 1.5% by weight.

SUMMARY OF THE INVENTION

According to the invention, there is provided a thin film optical waveguide, comprising a polymeric waveguiding film supported on a substrate, the film comprising a homopolymer of vinylpyridine or of a derivative of vinylpyridine in which the pyridine heterocyclic nucleus is substituted, or a copolymer containing a major proportion of vinylpyridine or of a derivative thereof.

Either ambient air or a layer of a material other than air whose refractive index is lower than that of the material of said waveguiding film is present over the waveguiding film, while the substrate is suitably made of material having a refractive index lower than that of the material of the waveguiding film.

The polymer is optionally modified so as to increase its capacity for refracive index variation in response to an electric field (such as may be generated by a laser beam) by inclusion in the polymerised structure of the polymer of one or more chemically bound optically non-linear moieties.

The waveguiding film will typically have a thickness of about 1 micron but its thickness may range, for example, from 0.26 microns to 10 microns, the overall requirement being the functional one that the thickness must be sufficient to propagate light of the wavelength selected and not so thick that light scattering is of too high a level and/or the film is difficult to fabricate.

In a particular embodiment of the invention, the polymer of the waveguiding film is a polymer having the formula:

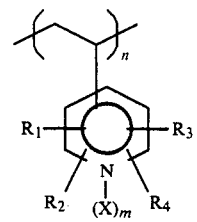

wherein X is a non-ionic moiety which imparts non-linear optics to the polymer, $R_1$, $R_2$, $R_3$ and $R_4$ are, each independently, hydrogen, an alkyl group of from 1 and 5 carbon atoms or a moiety which imparts non-linear optics to the polymer (eg an amino group or a nitro group), n is an integer and m is zero or has a value of not more than n. Conveniently, $R_1$, $R_2$, $R_3$ and $R_4$ are, each independently, hydrogen, methyl, ethyl, n-propyl or isopropyl.

2-nitro-5-amino substitution or 5-nitro-2-amino substitution is preferred in some cases where non-linear optics for the polymer are to be provided through selection of values for $R_1$, $R_2$, $R_3$ and $R_4$.

Preferably, the vinyl group occupies the 2- or 4-position on the pyridine heterocyclic nucleus.

Although the polymer may be poly-2-vinylpyridine, poly-4-vinylpyridine is preferred and has been found to possess good optical properties, good thermal stability and a good capacity for fabrication into various forms suitable for use in electro-optic and optical devices. Poly-4-vinylpyridine has good substrate adhesion, for example, and a low surface roughness, tests with a Tencor surface profiler showing a profile having an rms deviation of 7 nm over a distance of 2 mm.

For a waveguiding film to fulfill its function, the only basic requirement is that it should be disposed between materials having a lower refractive index such as to be capable of confining a light signal within the waveguiding film. With a substrate (e.g. glass) disposed on one side of the waveguiding film, the film face remote from the substrate may simply be exposed to air. This may be satisfactory in simpler arrangements. However, in practice an optical waveguide according to the invention will usually be in the form of a true sandwich in which the waveguiding film is disposed between a substrate and a further film which overlies the waveguiding film and acts as a buffer layer.

Typically, the further film will be a polymer film, examples of suitable polymeric materials for such film being polyvinylalcohol and polymethylmethacrylate. Polyvinylalcohol is particularly suitable because it is water-soluble, this and the fact that polyvinylpyridine films are water-insoluble facilitating ease of production of the two layers, as described in more detail hereinafter, by evaporation from solutions containing the respective polymers. In any event, the film forming the buffer layer will generally have a thickness of up to 3 microns.

In a particular embodiment of the invention, the waveguide comprises a plurality of waveguiding films in a layered structure in which each waveguiding film is separated from the next adjacent waveguiding film by a buffer film of a material having a refractive index lower than that of the material of the waveguiding films separated thereby.

Various materials may be used as substrate, examples being silicon dioxide deposited on silicon, glass, metallized glass and fused quartz. A typical metallized glass substrate will be a glass plate or slide provided with an evaporated copper or manganese film on one face.

The thickness of such metal layers is preferably 0.05 to 0.15 microns, a typical thickness being about 0.1 microns. Of course, the substrate could be a polymer film as described earlier, provided on a mechanical support. In multi-layer waveguides as just above-described, of course, only one substrate as such will ordinarily be present, such together with the lower layers of the structure acting as substrate for upper tiers.

The precise molecular weight is unlikely to be crucial to the achievement of reasonable levels of performance for devices containing a waveguide according to the invention. Typically, a polyvinylpyridine for use in waveguides according to the invention will have a molecular weight of at least 20,000. Ideally, the molecular weight should be so selected that the birefringence of the film is essentially constant (i.e. it increases no further with additional increases in molecular weight), although in practical devices where the input and output signals are coupled by optical fibres, birefringence is not important. Generally, it is likely that this point will be reached at molecular weights of approximately 50,000. It is of some importance for best results, however, that polydispersity should be sufficiently narrow that there is no significant proportion of the polymer material having a molecular weight below 20,000. This is particularly important when using relatively low molecular weight materials, such as polyvinylpyridine having a molecular weight of no more than 25,000. Polyvinylpyridine having a molecular weight below 20,000 or polyvinylpyridine having a wide polydispersity such that significant proportions have a molecular weight below 20,000 are unsatisfactory in that the polymer is susceptible to attack by a wider variety of solvents (e.g. aqueous solvents) and birefrigence is more susceptible to small changes in molecular weight.

It will be appreciated that a capacity to increase its refractive index when exposed to an electric field is a pre-requisite in optical switches. Application of an electric field to waveguides based, for example, on polyvinylpyridines per se results in a slight variation in the refractive index of the polymeric material. A more marked variation in refractive index such as is in practice essential in practical waveguide devices for switching purposes can be achieved by loading the film material with an optically non-linear material. Various materials having this effect when incorporated in thin polymer film waveguides are known. Examples of such materials which can satisfactorily be loaded into vinylpyridine polymer films in accordance with the invention are N-cyanomethyl-N-methyl-4-nitroaniline, N-4-nitrophenyl-L-prolinol, meta-nitroaniline, para-nitroaniline, N,N-dimethyl-aminonitrostilbene, methyl-(2,4-dinitrophenyl)-amino-2-propanoate, 2-methyl-4-nitroaniline, 2-methylbutyl-merocyanine, 2-(N,N-dimethylamino)-2-nitroacetanilide and R-(+)-5-nitro-2-[N-(1-phenylethyl)-amino]pyridine. A switching electric field can be provided in practical devices by means of electrodes disposed one on either side of the thickness of the waveguiding film although an appropriate electric field can be provided by other electrode configurations.

In addition to being provided with a capacity for refractive index increase for optical switch applications, waveguides are useful in simply steering light signals along paths defined as discrete channel guides within a waveguiding film. In practice, this may be necessary for various reasons, for example combining signals from separate optical fibres.

A dye can be incorporated into a waveguiding film in waveguides according to the invention to increase refractive index.

A dye may be distributed in such a manner as to provide a non-uniform refractive index profile. This results in the production of very effective channel guides for light signals input to the waveguiding film. For example, the waveguiding film may be a multi-layer film wherein one layer contains a dye (e.g. a laser dye such as a rhodamine, or an azo dye) and a further layer has no dye therein or a different concentration of dye. This provides a vertically non-uniform refractive index profile. A light signal input to the first-mentioned layer can be kept separate from a light signal input to the second layer and the direction of propagation of each of the two light signals controlled independently. In a practical device, it may be desired to do this for a number of reasons, for example, parallel processing of light signals in a single device to increase device speed.

Waveguides according to the invention may comprise dyed multiple layers for steering many separate light signals.

In an alternative arrangement, the dye may be provided in a first portion of the waveguiding film and a laterally adjacent second portion is devoid of the dye (or has a different dye concentration or perhaps even a different dye) so as to provide a laterally non-uniform refractive index profile. One method of producing a waveguide in this form is to include the dye in all of the waveguiding film and then to bleach the dye in a desired portion of the film so as to convert the dye to a non-chromic form. Bleaching may be effected by irradiation (e.g. with UV-radiation) of the film with appropriate parts exposed to the radiation and others protected or, less preferably, by means of a chemical bleaching agent diffused into the desired portion of the film.

It has been found that high loadings of non-linear materials and of dyes can be incorporated into waveguiding films used in the waveguides of the invention. Up to 20% by weight of 2-methyl-4-nitroaniline can, for example, be incorporated into poly-4-vinylpyridine films. 2-Methylbutyl merocyanine is difficult to incorporate in any polymer film in reasonable amounts without risk of later segregation. 0.4% could be included in poly-4-vinylpyridine cast films. However, cast films could not accommodate a concentration of 4.8% without segregation. Merocyanines have high optical non-linearities, however, and the capacity of films in waveguides according to the invention to include even small proportions is a significant achievement in practical terms. To illustrate the magnitude of this, 2-methylbutylmerocyanine has a molecular non-linearity larger than that of 2-methyl-4-nitroaniline by a factor of about 20.

Some dyes can be incorporated in the waveguiding films in especially large amounts. This capacity for high loading levels is especially significant since dyes cannot normally be loaded into thin films in other than small concentrations. Up to 65% by weight, for example, of some rhodamine laser dyes can be incorporated into poly-4-vinylpyridine films. This provides the capacity for very significant increases in refractive index and provides a means of producing very effective channel guides which enable a light signal input to a polyvinylpyridine film loaded with such a dye to be steered in directions which deviate in a very marked fashion from a straight line. Thus, for example, a rhodamine dye such as rhodamine 6 G can be used to define a channel guide in a film of poly-4-vinylpyridine in such a way that an input light signal can be deviated from its normally linear path through an acute angle, through a right angle or through an obtuse angle. This facility makes waveguides relying on rhodamine dyes particularly useful in many applications such as lasers in which a rhodamine dye is used as the active lasing element.

Channel guides can also be defined in the waveguiding film by producing a sandwich in which a waveguiding film interfaces with a further polymer film such as polyvinyl alcohol or polymethylmethacrylate configured with one or more longitudinal ridges in its surface remote from the interface, a region of the waveguiding film localized beneath each ridge and usually longitudinally coextensive therewith representing a channel guide for transmission of light which is input to the waveguiding film, in a typical such arrangement, the waveguiding film is disposed upon a substrate and a polymethylmethacrylate film configured with one or more ridges as just described is provided in overlying relationship with the waveguiding film.

As an alternative to loadings of non-linear material additives, the waveguiding film material may, of course, include molecular species which are chemically bound, e.g. as pendant groups, to the polymer backbone. Examples of chemically bound moieties imparting optically non-linear characteristics to the waveguiding film material are amino or nitro groups e.g. an amino group and a nitro group both substituted on the pyridine ring in poly-4-vinylpyridine or forming part of a pendant structure in which the amino and nitro group are separated by some other conjugated group. These may be included in a post-polymerization procedure or by provision thereof in the non-polymeric materials used for polymerization.

Regardless of whether the waveguiding film material includes molecular species which are chemically bound as pendant groups to the polymer backbone or admixed in the film material as a loaded component therein, the molecular species are preferably dipolar so as to be electrically orientable. In either of the two cases, the molecular orientation of the film material is ordinarily isotropic and its capacity for refractive index variation under the influence of an electric field is optimized only by impressing anisotropy. Alignment of dipolar molecules in practice can only be achieved by first heating the polymeric material to a point above its glass transition temperature. Upon reaching glass transition temperature, an electric field is applied to align the molecular dipoles, the field conveniently having a strength of from 50 volts/micron to 100 volts/micron. Cooling of the polymer film to below glass transition temperature is then allowed to take place naturally or caused artificially in order to freeze the molecular dipoles in such alignment. The electric field preferably remains applied until the temperature falls below the glass transition temperature. The resulting tendency of the polymer material to revert to an isotropic state is slight in the case of most loaded polymer systems but nevertheless real. It has been found in the case of polyvinylpyridine waveguiding films that the intrinsic insulating properties of the polymer cause entrapment of poling charges introduced during alignment, thus forming electrets. Self-discharge of these electrets has been found to be small at room temperature with the result that there is long term application to the molecular dipoles in the polymer matrix of internal electric fields which inhibit the return of the loaded material to a state of isotropy.

In a second of its aspects, the invention provides a process for producing a waveguide in which a waveguiding polymer-containing film is supported on a substrate acting as a buffer which process comprises dipping a substrate-defining member into a body of a solution comprising the material of the waveguiding film as solute in a volatile solvent, removing said member from said body of solution, allowing or causing the solvent to evaporate from the film of said solution adhering to said member to leave a film of said solute material (e.g. a polyvinylpyridine film) upon said member.

The dipping solution for producing waveguides according to the invention is conveniently an alcoholic solution, preferably a solution in isopropyl alcohol or another monohydric alcohol.

The dipped member may be post-dipped in a body of a solution containing material to be loaded in said waveguiding film, said material migrating into the waveguiding film from said solution. However, the polymer dipping solution preferably contains the non-linear material.

Of course, similar results may be obtained by spin coating or other coating techniques such as slow evaporation from solution.

Conveniently, poling of the film is effected post-formation, as described earlier.

A dye may be incorporated into the waveguiding film either by including said dye in the solution of the material of the waveguiding film into which the substrate-defining member is dipped or by introducing said dye into said film post-formation. Preferably, a portion of the dyed film is subjected to bleaching of the dye by radiation or the action of a chemical bleaching agent to provide a laterally non-uniform refractive index profile represented by a dyed film portion and a laterally adjacent film portion wherein dye originally present has been bleached. Radiation of wavelengths from 250 to 500 nm is preferred in bleaching. Protection of the film portion along a strip (e.g. 7 to 12 microns wide) can be accomplished by disposing one or more fine metal strips (e.g. embedded in a body of fused quartz) upon the surface of the film. Vertically non-uniform dye concentration profiles are conveniently obtained by providing one film deposit having a first dye concentration, cross-linking the waveguiding film polymer (e.g. poly-4-vinylpyridine) with short wavelength UV-radiation to protect the dye from solvent attack in a subsequent application of polymer solution and then applying a solution e.g. of the same polymer to provide an overlying further waveguiding or buffer film.

Withdrawal speed after dipping determines (in combination with polymer concentration) film thickness and is conveniently in the range from 10 mm/min to 50 mm/min.

Because a waveguiding film of polyvinylpyridine is water-insoluble, a water-soluble polymer buffer film such as a film of polyvinyl alcohol can be applied by dip-coating over the waveguiding film without deleteriously affecting the latter. By the same token, of course, polyvinyl alcohol is insoluble in alcohols such as isopropyl alcohol and can be supplemented easily by an overlying layer of a further waveguiding film of polyvinylpyridine.

In a further aspect, the invention provides a process for producing a ridge waveguide which process comprises depositing a first film (e.g. of a vinylpyridine polymer) upon a substrate, depositing a second film (e.g. polymethylmethacrylate) in overlying relationship with the first film upon said substrate, said second film comprising a depolymerization agent, each film comprising a polymeric material and the second film and the substrate being made of a material having a lower refractive index than the material of the first film and exposing the second film to radiation whilst regions thereof representative of the longitudinal and lateral extent of one or more film ridges are protected from such exposure so that exposed portions of the second film are depolymerized through a partial thickness thereof, depolymerized material being separated from the film to leave a second film characterized by a lower film surface punctuated by ridges of second film material.

The depolymerization promoter is conveniently benzil, present in an amount of, for example, 5% to 15% by weight of the polymeric material of the film (e.g. about 10%). 2-2-azo-bis(isobutyronitrile) may also be used as a depolymerization promoter.

The radiation will generally be UV-radiation and the regions protected therefrom will normally be protected by disposing one or more glass fibres upon the film surface.

The invention includes within its scope an integrated optical device wherein there is provided a waveguiding film, as defined hereinbefore, according to the invention.

BRIEF DESCRIPTION OF THE DRAWINGS

The invention will now be described by way of example, reference being made to the accompanying drawings in which.

DETAILED DESCRIPTION OF THE PREFERRED EMBODIMENTS

Figure 1:
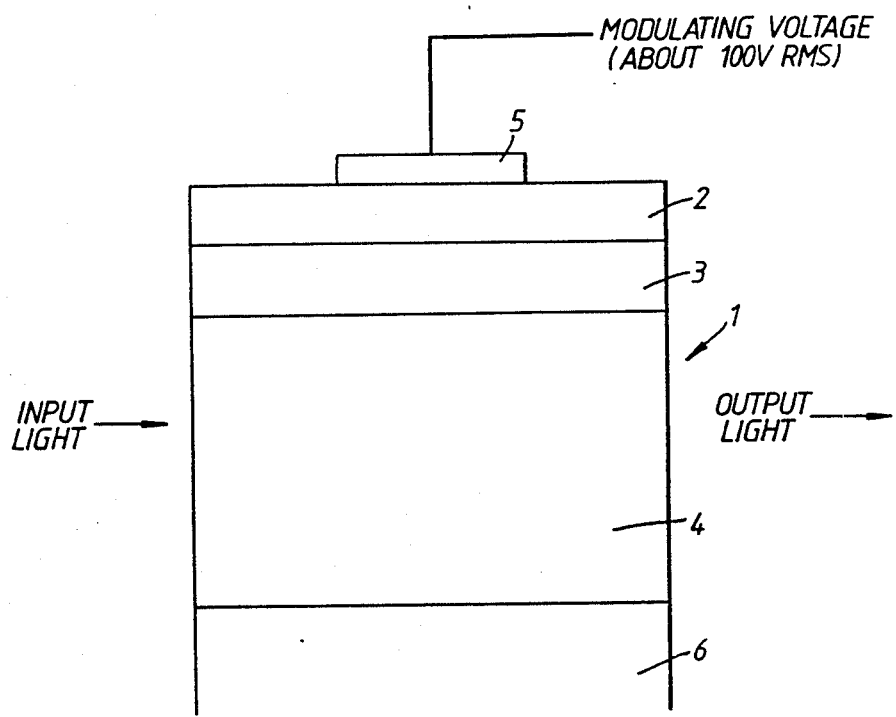
FIG. 1 is cross-section through one form of a waveguide according to the invention.

The waveguide shown in FIG. 1 comprises a layered structure 1 comprising a top film 2 of polyvinyl alcohol having a thickness of 1 micron, an underlying waveguiding film 3 of poly-4-vinylpyridine loaded with 2-methyl-4-nitroaniline in an amount of 10% by weight based on the total weight of the waveguiding film and having a thickness of 1.19 microns, and a supporting substrate comprising a 5 microns thick layer 4 of silicon dioxide deposited on an n-type doped silicon base 6 which forms a silicon electrode. An evaporated silver top electrode 5 completes the structure.

Figure 2:
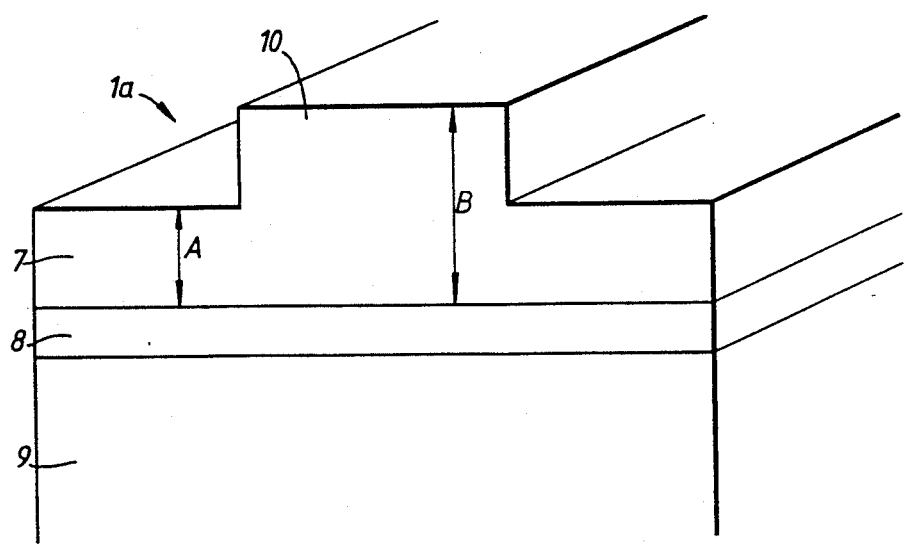
FIG. 2 is a cross-section through one form of a ridge waveguide according to the invention.

The waveguide of FIG. 2 comprises a layered structure 1a comprising an upper film 7 of polymethylmethacrylate having a thickness A of 0.5 microns, an underlying waveguiding film 8 of poly-4-vinylpyridine having a thickness of 0.26 microns and a fused quartz supporting substrate 9.

The layer 7 of polymethylmethacrylate is formed with a 10 microns wide ridge 10, the thickness B of the film beneath the summit of the ridge being 0.92 microns.

Figure 3:
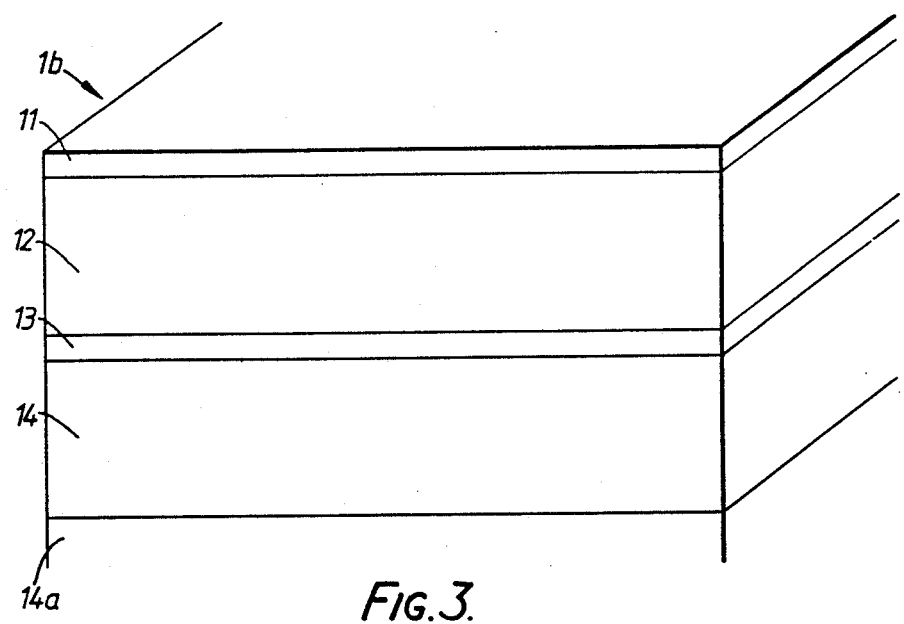
FIG. 3 is a cross-section through one form of a multilayer waveguide according to the invention.

The multi-layer waveguide shown in FIG. 3 comprises a layered product 1b comprising a top film 11 of polyvinyl alcohol and having a thickness of 0.5 microns. This film overlies a film 12 of poly-4-vinylpyridine having a thickness of 3.15 microns. This sub-structure is repeated by the presence of polyvinyl alcohol film 13 and poly-4-vinylpyridine film 14 underlying film 12, films 13 and 14 also having thicknesses of 0.5 microns and 3.15 microns, respectively. The layered structure 1b is supported upon a substrate layer 14a of silicon dioxide deposited on silicon. In a simple basic waveguide device, an input optical fibre is disposed close to layer 14 on one side and an output optical fibre provided close to layer 14 on the other side. A non-linear optical material present in layers 12 and 14 is aligned by poling. The intensity of light captured by the output fibre is changed by an electric field applied by an electrode of evaporated silver on top of layer 11, the ground electrode being formed by the silicon 8 beneath layer 14a.

Figure 4:
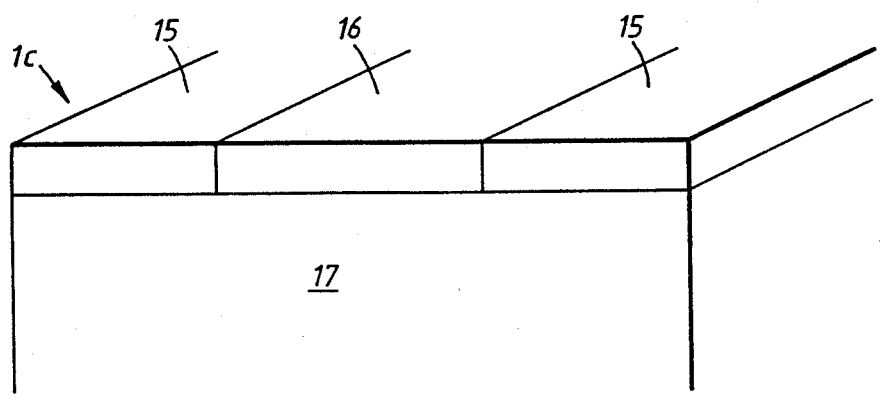
FIG. 4 is a cross-section through a waveguide according to the invention showing a laterally non-uniform refractive index profile.

The waveguide shown in FIG. 4 comprises a single 2 microns thick film of poly-4-vinylpyridine having laterally adjacent longitudinally extending portions 15 and 16 and deposited on a fused quartz substrate 17. The film portion 16 has a width of 8 microns and contains rhodamine 6 G laser dye in a concentration of 35% by weight based on the weight of the film in that portion. The same dye originally present in the same amount in each of portions 15 has been bleached so that only portion 16 remains dyed.

Figure 5:
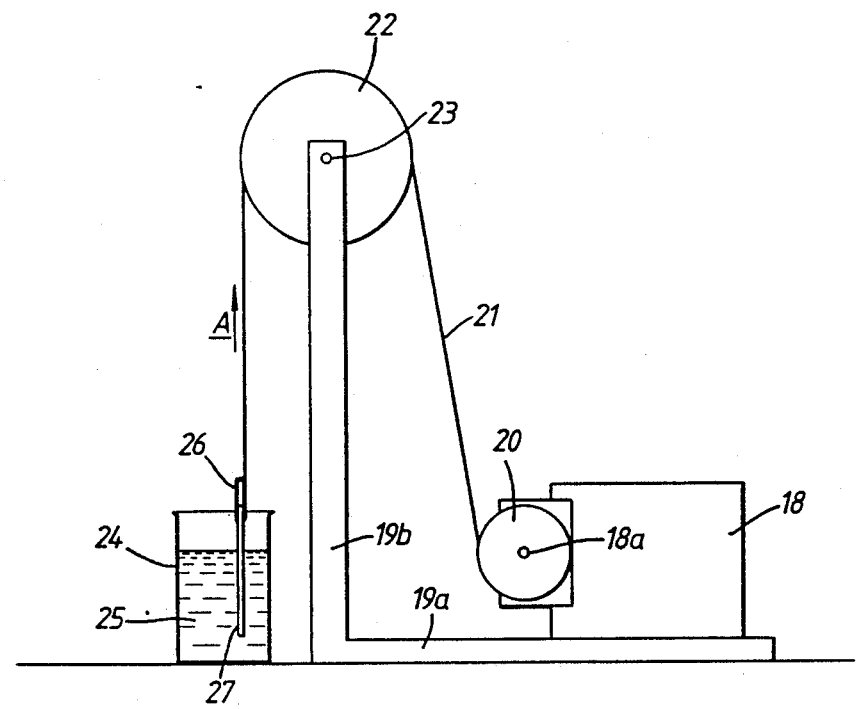
FIG. 5 is a schematic view of a film coating apparatus useful in producing waveguides according to the invention.

The apparatus shown in FIG. 5 comprises an electric motor 18 mounted to a steel plinth 19a. A driven pulley wheel 20 is mounted for rotation to the output shaft 18a of the motor 18. Column 19b mounts at its top a pulley wheel 22 rotatable upon shaft 23.

A pulley cable or line 21 has one of its ends secured to a fixture point on pulley wheel 20, its other end being provided with a spring clip 26. The latter is used in practice to grasp a glass slide depicted in the figure by reference numeral 27. The slide 27 is shown immersed in a body of an alcoholic solution of poly-4-vinylpyridine 25 contained in a beaker 24.

In use, the plinth 19a is set up on a work surface and the pulley line 21 passed along its circuit over pulley wheels 20 and 22 as shown in FIG. 5, a length of line remaining wound upon pulley wheel 20. A body of the polymer solution is charged to beaker 24 and the beaker disposed adjacent the plinth 19a and column 19b as shown in the figure. Clip 26 is operated to secure to the line 21 a glass slide 27. The slide is then immersed to a desired depth in the body of solution 25, the pulley line 21 being pulled for this purpose from the wound supply retained on pulley wheel 20.

The motor 18 is then operated to withdraw the slide 27 from the body of polymer solution 25 at a predetermined velocity selected from a range of available velocities at a control (not shown) of the motor 18. A further control (not shown) of motor 18 ensures that a microswitch (not shown) causes the motor to cease to operate after a predetermined desired vertical displacement of the slide 27 in the direction of the arrow A shown in FIG. 5. Of course, motor 18 may be so arranged that displacement of the slide 27 for immersion in the body of polymer solution 25 may also be effected through similarly controlled operation of the motor.

Figure 14:
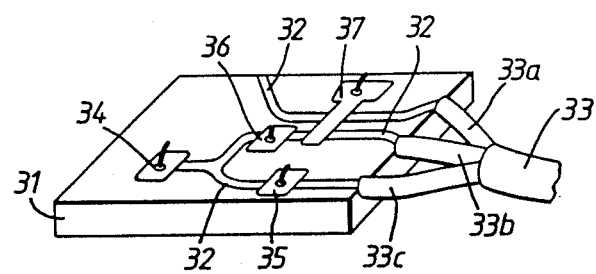
FIG. 14 shows schematically an integrated optics device incorporating a waveguide according to the invention.

The integrated optics device shown in FIG. 14 comprises a substrate of silicon dioxide deposited on silicon, an overlying waveguiding film of poly-4-vinylpyridine comprising portions 32 dyed with rhodamine 6 G in a concentration of 50% by weight of the film material in said portions and a top layer comprising a film of polyvinyl alcohol. In the figure, the layered structure is much simplified in the interests of clarity of depiction, the substrate, the top film and the bulk of the waveguiding film being signified collectively by the reference numeral 31 and only the dyed portions 32 being represented specifically. The structure was prepared by a procedure analogous to that of Example 7 hereinafter.

In FIG. 14, it will be seen that a cable 33 of monomode optical fibres 33a, 33b and 33c couples with the waveguide channels 32. A laser device 34 is formed as part of the integrated optics by a portion of one of the rhodamine dyed channels 32. Electrooptic modulators 35, 36 are of conventional form as is electrooptic switch 37.

The following specific Examples are intended further to illustrate the invention:

EXAMPLE 1

Figure 13:
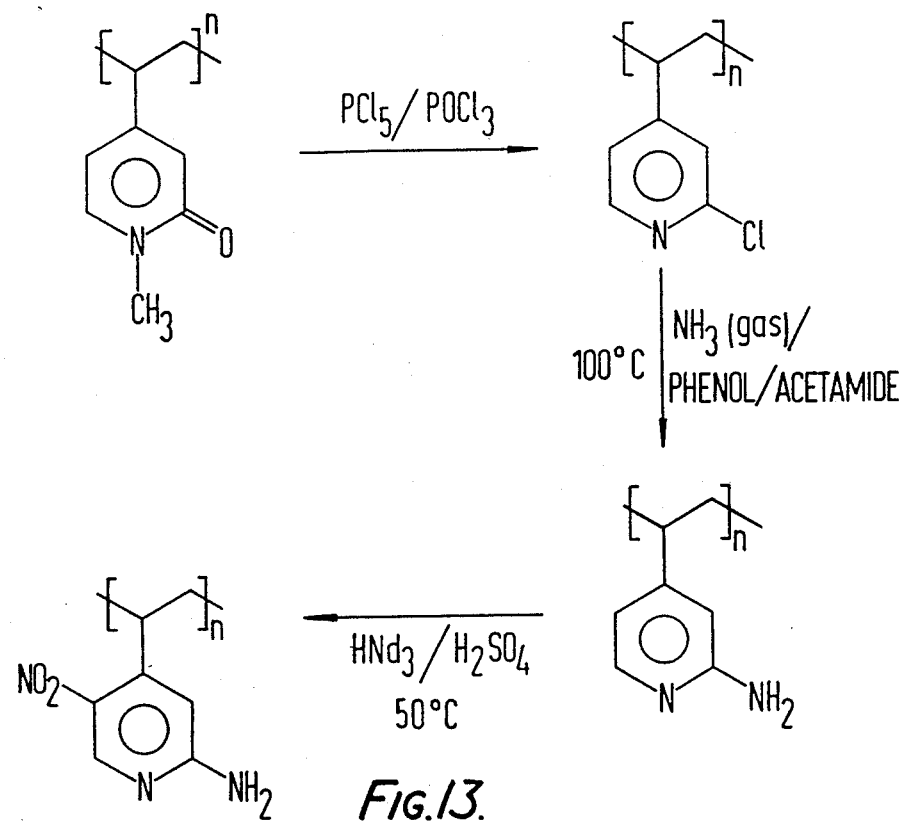
FIG. 13 shows the reaction scheme referred to in Example 1 hereinafter.

Post-polymerization modification of a poly-4-vinylpyridine polymer available under the trade designation Reilline 240, UN No 1219 from Reilly Chemicals SA was effected to introduce an optically non-linear component chemically bound as part of the structure according to the reaction represented in FIG. 13.

EXAMPLE 2

Figure 8:
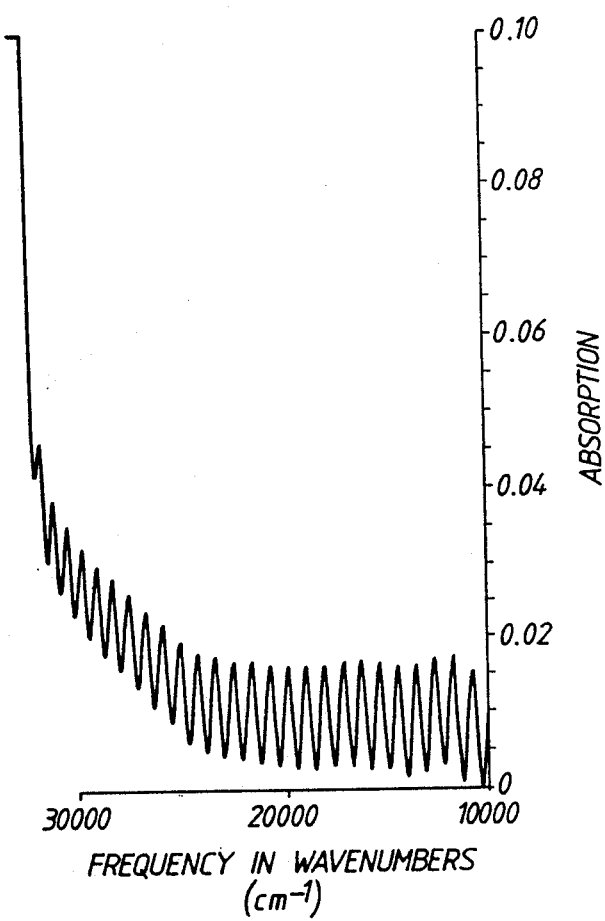
FIG. 8 shows interference fringes in poly-4-vinylpyridine film applied to a substrate using the apparatus of FIG. 5.
Figure 9:
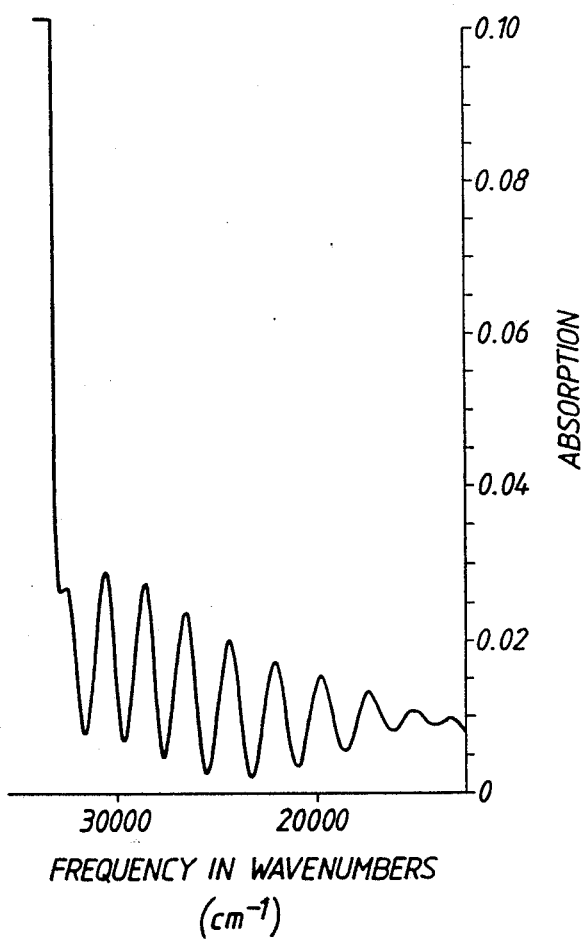
FIG. 9 is similar to FIG. 8 but shows interference fringes for a thinner poly-4-vinylpyridine film produced at a much lower withdrawal velocity.

165 g of Reilline 240, UN No 1219 were dissolved in 100 ml of isopropyl alcohol. A microscope slide was dipped in a body 25 of the solution contained in a beaker 24 using the apparatus shown in FIG. 5. The temperature of the solution was 16° C. The slide was withdrawn at an actual withdrawal velocity of 5.4 cm/minute and left suspended from line 21 for the solvent to evaporate (and excess solution to drip from the slide) at a room temperature of 16° C. A film of thickness 3.73 microns was obtained. The above procedure was repeated using a second slide and a withdrawal velocity of 1.2 cm/minute to produce a film having a smaller thickness, namely 1.47 microns. The refractive index for the polymer films was measured as 1.579 in both cases. The interference fringes were determined as a function of frequency. The results are depicted by the curves of FIGS. 8 and 9, respectively. In the case of each film, the film appeared visually water white.

EXAMPLE 3

Figure 6:
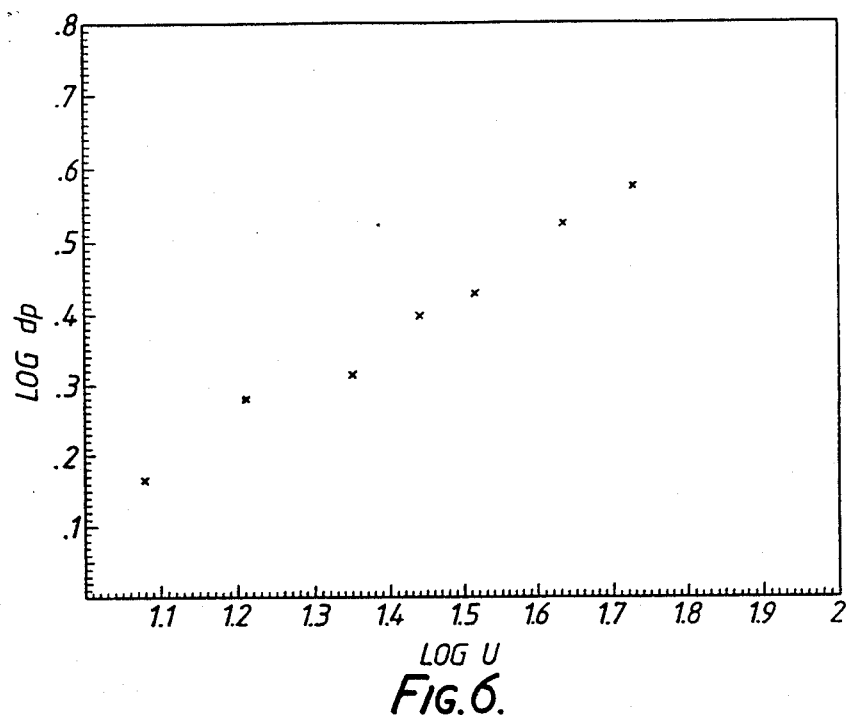
FIG. 6 is a curve to represent dependence of poly-4-vinylpyridine film thickness on withdrawal velocity when dipping using the apparatus of FIG. 5.

The dipping procedure of Example 2 was repeated at a range of withdrawal velocities and the resulting film thickness determined from the frequencies of standing waves observed in the visible-IR spectra. The relationship between film thickness and withdrawal velocity was then represented logarithmically. The results are shown by the curve depicted in FIG. 6.

EXAMPLE 4

Figure 7:
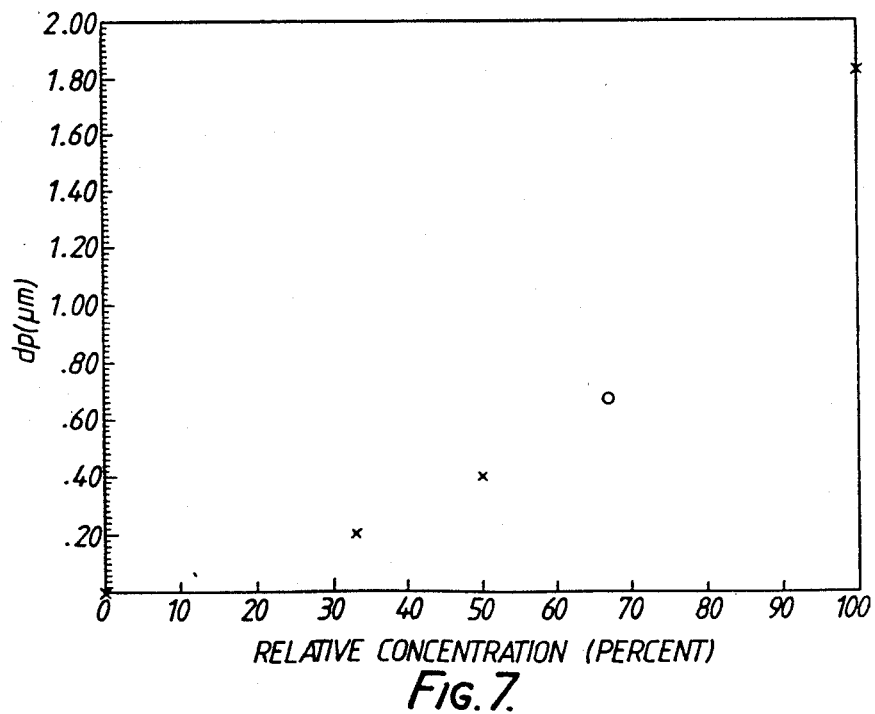
FIG. 7 is a curve showing dependence of film thickness on poly-4-vinylpyridine concentration in a dipping solution applied to a substrate using the apparatus of FIG. 5.

The dipping procedure of Example 2 was repeated at a range of polymer concentrations in the alcoholic solution, in each case the slide withdrawal velocity being 2.25 cm/minute. The film thickness obtained in each case was determined from the frequencies of standing waves observed in the visible-IR spectra and the relationship between film thickness and polymer concentration plotted. The results are shown in FIG. 7.

EXAMPLE 5

Figure 10:
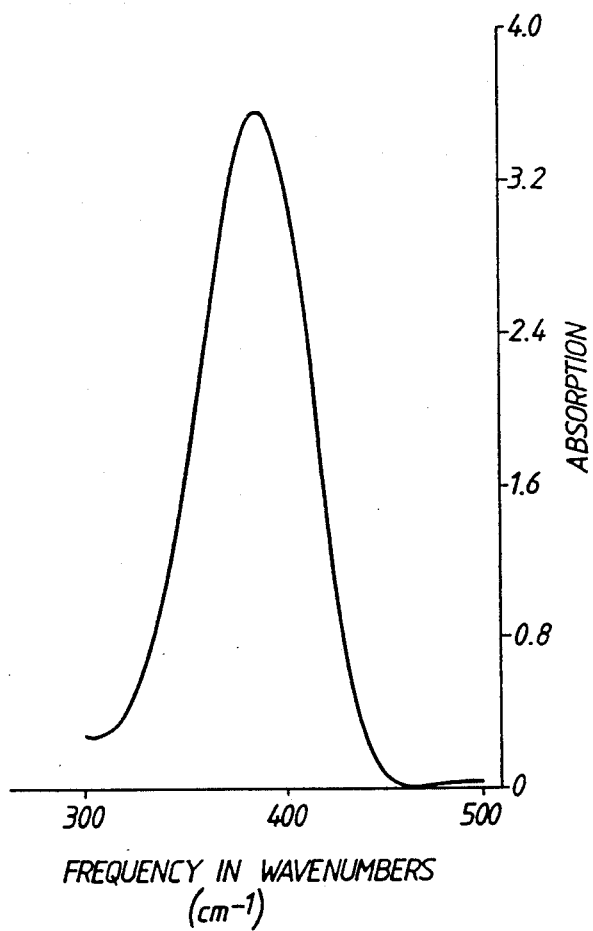
FIG. 10 shows the visible absorption spectrum of 2-methyl-4-nitroaniline in a poly-4-vinylpyridine film.

The dipping procedure of Example 2 was repeated but with the polymer solution augmented with 20% by weight of 2-methyl-4-nitroaniline (exact composition:- 101 ml isopropyl alcohol, 6.765 g poly-4-vinylpyridine, 1.6842 g 2-methyl-4-nitroaniline). Slide withdrawal velocity was 2 cm/minute. A polymer film thickness of 0.83 microns was obtained after solvent evaporation. Refractive index was measured as 1.6165. The proportion of 2-methyl-4-nitroaniline in the solution was reproduced in the solid polymer film. The visible absorption spectrum was determined. The result is shown in FIG. 10.

EXAMPLE 6

Figure 11:
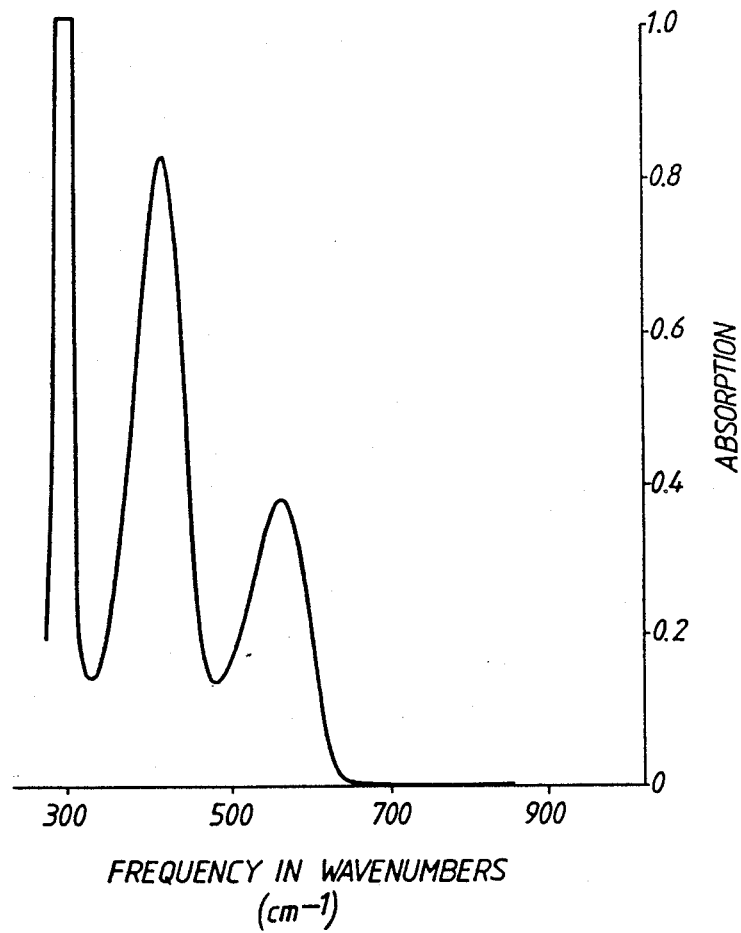
FIG. 11 shows the visible absorption spectrum of 2-methylbutylmerocyanine in a poly-4-vinylpyridine film.

0.4% 2-Methyl-butylmerocyanine was included in poly-4-vinylpyridine by dissolving 0.0168 g of the merocyanine in a mixture of 25 ml ethanol and 2 ml of the polymer solution referred to in Example 2, pouring the resulting mixture onto a glass slide and then allowing controlled evaporation of the solvent by a conventional slow evaporation technique. The determined visible absorption spectrum is shown in FIG. 11. Film thickness was 25 microns and refractive index was measured as 1.58. The proportion of merocyanine in the solution was reproduced in the solid polymer film.

EXAMPLE 7

The procedure of Example 5 was repeated except that a rhodamine 6 G laser dye available under the trade designation 20,132/4 from Aldrich Chemical Co Ltd was included in the polymer solution instead of 2-methyl-4-nitroaniline. The rhodamine dye amounted to 65% by weight (referred to the total amount of dye and polymer). The proportion of dye in the solution was most surprisingly reproduced in the solid polymer film. No segregation of dye from the polymer was observed after several months storage. The dye component was accordingly able to influence the refractive index of the film material to a marked degree. Refractive index for the film was measured as 1.695.

EXAMPLE 8

Figure 12:
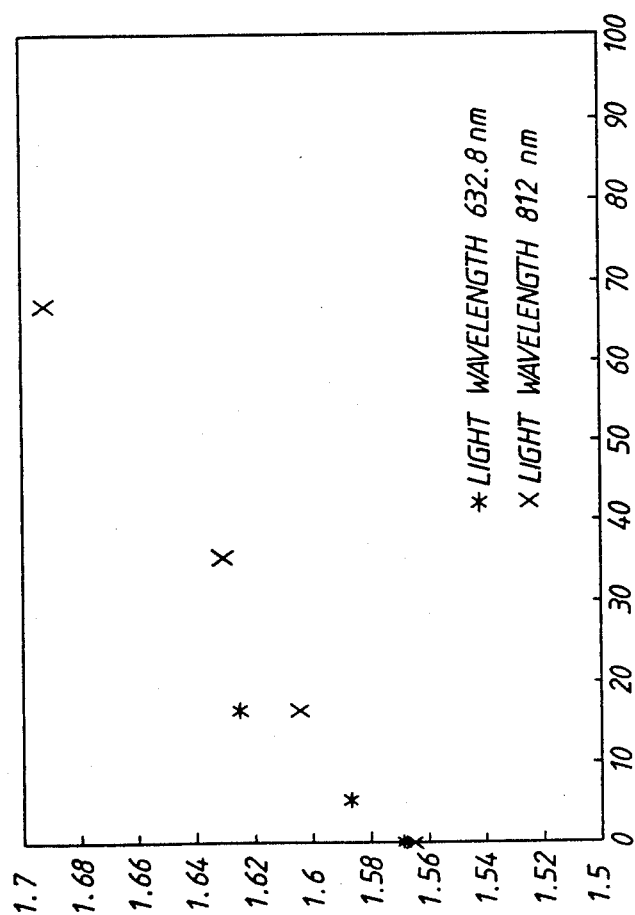
FIG. 12 is a curve which shows the dependence of the refractive index of a poly-4-vinylpyridine film on the concentration of rhodamine 6 G laser dye contained in solid solution in the film.

The procedure of Example 7 was repeated for a range of rhodamine dye concentrations. The dependence of refractive index on dye concentration was plotted. The results are shown in FIG. 12.

EXAMPLE 9

A waveguide prepared as in Example 2 but having a film thickness of 3.15 microns was dipped in an aqueous solution of polyvinyl alcohol (polymer concentration: 4.01 g in 50 ml water) at a solution temperature of 18° C. and withdrawn at a velocity of 2 cm/minute. A polyvinyl alcohol film 0.52 micron in thickness had been deposited over the previously deposited poly-4-vinylpyridine film after leaving the withdrawn waveguide for 20 minutes to dry at a room temperature of 18° C. The film refractive index was measured as 1.52. Because poly-4-vinylpyridine is insoluble in water, the further dipping operation had no deleterious effects on the previously deposited poly-4-vinylpyridine film. The waveguide produced according to Example 5 was treated in the same fashion with similar results, the 2-methyl-4-nitroaniline not being leached from the poly-4-vinylpyridine.

EXAMPLE 10

The multi-layer waveguide produced according to Example 9 was dipped in a body of a poly-4-vinylpyridine solution as in Example 2 and the procedures of Example 2 repeated. A solid second film of poly-4-vinylpyridine (equal in thickness to the first) was deposted on the polyvinyl alcohol film after solvent evaporation had taken place. Because polyvinyl alcohol is not soluble in isopropyl alcohol, the dipping procedure to produce a second waveguiding film had no deleterious effects on the polyvinyl alcohol film.

EXAMPLE 11

The waveguide of Example 2 was dipped in a solution containing 11.54 g polymethylmethacrylate (available under the trade designation 18226/5 from Aldrich Chemical Co Ltd) in 96.5 ml of methyl ethyl ketone and 10 ml methyl methacrylate. Withdrawal speed was 2 cm/minute. After evaporation of the methyl ethyl ketone, a polymethylmethacrylate buffer film having a thickness of 1.58 microns was left deposited over the previously deposited poly-4-vinylpyridine waveguiding film. Refractive index for the new film was measured as 1.5.

EXAMPLE 12

The waveguide produced in Example 7 was placed on a flat surface and an 8 micron strip of the dyed poly-4-vinylpyridine film covered by a mask comprising fine metallic strips in a fused quartz slide acting as a UV-radiation barrier. Radiation of wavelength 400 nm from a high pressure mercury discharge lamp was then irradiated onto the waveguide until the exposed film had become bleached. The glass fibre was removed revealing a residual dyed strip in the film.

EXAMPLE 13

A waveguide produced as in Example 11 except that 10% by weight of the polymethylmethacrylate film of benzil was present in the film (as a result of its inclusion in the methyl ethyl ketone) was treated in the same way as in Example 12 except that the masking was effected using a single glass fibre. The UV-radiation cooperated with the benzil to depolymerize the polymethylmethacrylate in the exposed regions to a depth of about 0.42 microns. The monomeric methyl methacrylate depolymerization product evaporated to produce a recessed region either side of the strip covered by the glass fibre, the latter strip forming a ridge localizing a solution to the wave propogation equation in the poly-4-vinylpyridine film beneath.

EXAMPLE 14

A waveguide produced in a similar fashion to Example 5 but having the structure shown in FIG. 1 of the drawings was heated to a temperature of 160° C. thus heating the poly-4-vinylpyridine film to a temperature slightly more than its glass transition temperature.

Whilst maintaining such temperature, a DC electric field of 200 volts was applied across the film by means of the electrodes 5 and 6.

The electric field was held for 30 minutes whilst the film was allowed to cool at room temperature to below the glass transition temperature of the poly-4-vinylpyridine. High power laser testing revealed that the non-linear 2-methyl-4-nitroaniline molecules had become aligned to the field and that the anisotropy had become frozen in the film.

The invention as described earlier without reference to the drawings may include any one or more features of the invention as described with reference to the drawings. Loaded polymers as disclosed herein (e.g. of poly-4-vinylpyridine), such as in film form, are included per se within the scope of the invention (particularly vinylpyridine polymers loaded with dyes).

We claim:

1. A thin film optical waveguide, comprising a polymeric waveguiding film supported on a substrate, the film comprising a polymer selected from the group consisting of homopolymers of vinylpyridine, homopolymers of derivatives of vinylpyridine in which the pyridine heterocyclic nucleus is substituted, copolymers containing a major proportion of vinylpyridine, and copolymers containing a major proportion of a derivative of vinyl-pyridine in which the pyridine heterocyclic nucleus is substituted.

2. A waveguide as claimed in claim 1, wherein a buffer layer of a material whose refractive index is lower than that of the material of the waveguiding film overlies said film.

3. A waveguide as claimed in claim 1, wherein the buffer layer is a film of a polymer selected from the group consisting of polyvinyl alcohol and polymethylmethacrylate.

4. A process for producing a thin film optical waveguide as defined in claim 3, the waveguide having at least one of said polymeric waveguiding film with the buffer layer in contact therewith, the method of comprising depositing each layer by dipping the substrate in a solution of the polymeric material from which the layer is to be formed.

5. A waveguide as claimed in claim 1, wherein the polymer is modified so as to increase its capacity for refractive index variation in response to an electric field by inclusion in the polymerised structure of the polymer of one or more chemically bonded optically non-linear moieties.

6. A waveguide as claimed in claim 1, wherein the waveguiding film comprises, in admixture with the polymer, one or more optically non-linear materials, whereby the capacity for refractive index variation in response to an electric field is increased.

7. A waveguide as claimed in claim 1, and wherein said waveguiding film comprises, in admixture with the polymer, one or more optically non-linear materials selected from the group consisting of N-cyanomethyl-N-methyl-4-nitroaniline, N-4-nitrophenyl-L-prolinol, metanitroaniline, para-nitroaniline, N,N-dimethylaminonitrostilbene, methyl-(2,4-dinitrophenyl)-amino-2-propanoate, 2-methyl-4-nitroaniline, 2-methyl-butylmerocyanine, 2-(N,N-dimethylamino)-2-nitroacetanilide, and R-(+)-5-nitro-2-[N-(1-phenylethyl)-amino]pyridine.

8. A waveguide as claimed in claim 1, wherein the polymer of said waveguiding film is a polymer having the formula:

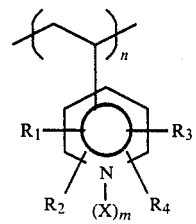

wherein X is a non-ionic moiety which imparts non-linear optical characteristics to the polymer, $R_1$, $R_2$, $R_3$ and $R_4$ are, each independently, hydrogen or an alkyl group of from 1 to 5 carbon atoms or a moiety which imparts non-linear optical characteristics to the polymer, n is an integer and m is zero or has a value of not more than n.

9. A waveguide as claimed in claim 1, wherein the polymer of said waveguiding film is poly-4-vinylpyridine.

10. A waveguide as claimed in claim 1, comprising a plurality of waveguiding films in a layered structure in which each waveguiding film is separated from the next adjacent waveguiding film by a buffer film of a material having a refractive index lower than that of the material of the waveguiding films separated thereby, the buffer film being made of a polymer selected from the group consisting of polymethylmethacrylate or polyvinyl alcohol.

11. A waveguide as claimed in claim 1, wherein the polymer is cross-linked.

12. A process for producing a thin film optical waveguide, comprising depositing a polymeric waveguiding film on a substrate, depositing over the waveguiding film a second polymeric film containing a depolymerisation agent, the material of the second film and of the substrate having a lower refractive index than the waveguiding film, exposing the second film to radiation while protecting from radiation at least one area of the second film, the exposure being such as to depolymerise the second film only through a partial thickness thereof, and removing the depolymerised material to leave at least one ridge upstanding from the remainder of the second film.

13. A process according to claim 12, wherein the wave-guiding film comprises a polymer selected from the group consisting of homopolymers of vinylpyridine, homopolymers of derivatives of vinylpyridine in which the pyridine heterocyclic nucleus is substituted, copolymers containing a major proportion of vinylpyridine, and copolymers containing a major proportion of a derivative of vinylpyridine in which the pyridine heterocyclic nucleus is substituted.

14. A process as claimed in claim 12, wherein the depolymerisation agent is benzil.

15. A process as claimed in claim 12, wherein the depolymerisation agent is 2,2-azo-bis(isobutyronitrile).

16. A process as claimed in claim 12, wherein the depolymerisation agent is benzil, said benzil being present in the buffer film in an amount of from 5% to 15% by weight based on the weight of polymeric material in said buffer film.

* * * * *